United States Patent
Zimnicki et al.

(10) Patent No.: US 12,085,772 B2
(45) Date of Patent: Sep. 10, 2024

(54) APPARATUSES AND METHODS FOR OPTICAL FIBER FURCATION

(71) Applicant: Belden Inc., St. Louis, MO (US)

(72) Inventors: James John Zimnicki, Richmond, IN (US); Ana Carolina Marino Cruz, Montreal (CA)

(73) Assignee: Belden Inc., St. Louis, MO (US)

( * ) Notice: Subject to any disclaimer, the term of this patent is extended or adjusted under 35 U.S.C. 154(b) by 0 days.

(21) Appl. No.: 18/084,110

(22) Filed: Dec. 19, 2022

(65) Prior Publication Data

US 2023/0194819 A1 Jun. 22, 2023

Related U.S. Application Data

(60) Provisional application No. 63/291,911, filed on Dec. 20, 2021.

(51) Int. Cl.
G02B 6/44 (2006.01)
G02B 6/54 (2006.01)

(52) U.S. Cl.
CPC ....... *G02B 6/44715* (2023.05); *G02B 6/4472* (2013.01); *G02B 6/545* (2023.05)

(58) Field of Classification Search
CPC .......................... G02B 6/4471; G02B 6/44715
See application file for complete search history.

(56) References Cited

U.S. PATENT DOCUMENTS 6,055,350 A * 4/2000 Brown .................. G02B 6/502
385/100
6,409,155 B1 * 6/2002 Brown ................... G02B 6/52
254/134.3 R (Continued)

FOREIGN PATENT DOCUMENTS

DE 102016012960 A1 * 5/2017

OTHER PUBLICATIONS

Thorlabs, FN96A Guide to Connectorization and Polishing Optical Fibers, Rev D, Apr. 17, 2013. (retrieved via https://june.uoregon.edu/mediawiki/images/f/f8/FN96A-Manual.pdf) (Year: 2013).*

(Continued)

*Primary Examiner* — Michael Stahl
(74) *Attorney, Agent, or Firm* — MH2 Technology Law Group LLP

(57) ABSTRACT

The present disclosure describes apparatuses and methods for separating and installing optical fibers into furcation tubing. A fiber optic furcation assembly can include a fan-out structure. The fan out structure can include a conduit, and the conduit can extend from a first face of the fan-out structure to an opposing second face of the fan-out structure. The fiber optic furcation assembly can also include a furcation tube. The furcation tube can be positioned within the conduit, and the furcation tube can extend to a terminal end beyond the second face of the fan-out structure. The fiber optic furcation assembly can also include a fiber pull. The fiber pull can be positioned within the furcation tube, and the fiber pull can protrude in a first portion beyond the first face of the fan-out structure and the fiber pull can protrude in a second portion beyond the terminal end of the furcation tube, and the fiber optic furcation assembly can also include an attachment structure. The attachment structure can be fixed to the first portion of the fiber pull, and the attachment structure can receive and couple with an optical fiber. The fiber pull can include a diameter and the attachment structure can include a diameter. The diameter of the fiber pull and the diameter of the attachment structure can be less than a diameter of the furcation tube.

18 Claims, 8 Drawing Sheets

(56) References Cited

U.S. PATENT DOCUMENTS

2001/0048795 A1* 12/2001 Nagasaki ............ G02B 6/4467
                                                            385/100
2008/0138026 A1   6/2008 Yow et al.
2012/0080651 A1*  4/2012 Abbiati ................ G02B 6/4465
                                                            254/134.3 R
2014/0241679 A1   8/2014 Kachmar et al.

OTHER PUBLICATIONS

PCT International Search Report and Written Opinion for International Application No. PCT/US2022/082007 mailing date Mar. 24, 2023, 13 pages.

* cited by examiner

APPARATUSES AND METHODS FOR OPTICAL FIBER FURCATION

CROSS-REFERENCE TO RELATED PATENT APPLICATIONS

This application claims the benefit of and priority to U.S. Provisional Patent Application No. 63/291,911 filed Dec. 20, 2021, the entirety of which is incorporated by reference herein.

BACKGROUND

Fiber optic cables can include one or more optical fibers. The optical fibers can be coated and packaged into a cable.

SUMMARY

The present disclosure describes apparatuses and methods for separating and installing optical fibers into furcation tubing. Implementations of a furcation or fan-out kit can include furcation tubes pre-threaded with a fishing tape or pull wire, referred to generally as a pulling member, and ending in an attachment structure. A prepared and cleaned optical fiber can be inserted into the attachment structure and fixed within the structure (e.g. via an adhesive, heat shrink, ultraviolet-curable resin, etc.). For example, the attachment structure can include heat-shrinkable tubing with a shrunken outer diameter smaller than the internal diameter of the furcation tubing, and heat can be applied to shrink the tubing to fix the fiber within the attachment structure and/or pulling member. The attachment structure can also include a UV-curable resin and UV light can be applied to fix the fiber in the attachment structure and/or pulling member. The attachment structure can also include an adhesive (e.g. a cyanoacrylate glue) and the fiber can be inserted into the adhesive (e.g. after being sprayed with an activator or accelerator such as acetone) to be fixed within the structure. Once the fiber is fixed within the structure, the fishing tape or pull wire can be retracted to pull the attachment structure and optical fiber through the furcation tube. As the optical fiber can be stronger and less prone to breakage under tension than compression, the fiber can be installed in the furcation tube easier and faster, improving success rates and speed of installation.

At least one aspect is generally directed to a fiber optic furcation assembly. The fiber optic furcation assembly can include a fan-out structure. The fan out structure can include a conduit, and the conduit can extend from a first face of the fan-out structure to an opposing second face of the fan-out structure. The fiber optic furcation assembly can also include a furcation tube. The furcation tube can be positioned within the conduit, and the furcation tube can extend to a terminal end beyond the second face of the fan-out structure. The fiber optic furcation assembly can also include a fiber pull. The fiber pull can be positioned within the furcation tube, and the fiber pull can protrude in a first portion beyond the first face of the fan-out structure and the fiber pull can protrude in a second portion beyond the terminal end of the furcation tube, and the fiber optic furcation assembly can also include an attachment structure. The attachment structure can be fixed to the first portion of the fiber pull, and the attachment structure can receive and couple with an optical fiber. The fiber pull can include a diameter and the attachment structure can include a diameter. The diameter of the fiber pull and the diameter of the attachment structure can be less than a diameter of the furcation tube.

At least one aspect is generally directed to a fiber optic furcation assembly. The fiber optic furcation assembly can include a furcation tube. The furcation tube can be positioned within a fan-out structure, and the furcation tube can extend beyond a terminal end of the furcation tube. The fiber optic furcation assembly can also include a fiber pull. The fiber pull can be positioned within the furcation tube, and the fiber pull can protrude in a first portion beyond a face of the fan-out structure and the fiber pull can protrude in a second portion beyond the terminal end of the furcation tube, and the fiber optic furcation assembly can also include an attachment structure. The attachment structure can be fixed to the first portion of the fiber pull, and the attachment structure can receive and couple with an optical fiber;

At least one aspect is generally directed to a method of manufacturing a fiber optic furcation assembly. The method can include disposing a conduit within a fan-out structure, and extending the conduit from a first face of the fan-out structure to an opposing second face of the fan-out structure. The method can also include positioning a furcation tube within the conduit, and extending the furcation tube to a terminal end beyond the second face of the fan-out structure. The method can also include disposing a fiber pull within the furcation tube, and protruding the fiber pull in a first portion beyond the first face of the fan-out structure and protruding the fiber pull in a second portion beyond the terminal end of the furcation tube, and the method can include fixing an attachment structure to the first portion of the fiber pull, and the attachment structure configured to receive and couple with an optical fiber.

At least one aspect is generally directed to a method of assembling a fiber optic fan-out. The method can include fixing an optical fiber within an attachment structure of a fiber optic furcation assembly. The attachment structure can be fixed to a first portion of a fiber pull. The fiber pull can protrude in the first portion beyond a first face of a fan-out structure. The method can also include positioning the fiber pull within a furcation tube and the fiber pull can extend from the fan-out structure to a terminal end. The fiber pull can protrude in a second portion beyond the terminal end of the furcation tube. The method can also include pulling the second portion of the fiber pull from the terminal end of the furcation tube such that the optical fiber is pulled, via the attachment structure, through the furcation tube, and once the optical fiber is extended through the furcation tube, detaching the fiber pull and attachment structure from the optical fiber.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

The present application relates to multi-fiber optical cables. In particular, the present application relates to apparatuses and methods for separating and installing optical fibers into furcation tubing.

Fiber optic cables described herein can include multi-fiber cables with a plurality of individual optical fibers. To terminate these individual fibers at connectors or devices, the fibers can be separated using fan-out or furcation kits comprising furcation tubing. The loose fibers can be individually prepared by stripping off a surrounding jacket or buffer tube (e.g., as a "loose" buffer tube, as there can be some space within the buffer tube surrounding the fibers such that they are able to move freely), cleaning the exposed fibers, and pushing them through furcation tubes. The furcation tubes can be colored to provide visual identification of the different fibers, and can allow use of standard connectors configured for individual fibers with smaller diameter jackets or buffer tubes.

Furcation tubing can have lengths that can be long relative to the diameter of the individual fibers, frequently around 0.5 meters, 1 meter, or more in length, compared to the optical fibers with diameters on the order of microns (e.g. approximately 250-500 microns). Inserting a fiber into and through the full length of a furcation tube can be frustrating technical challenge, as any snagging (which can be aggravated by dirt or debris encountered in typical installation environments) can result in the fiber breaking at some midpoint of the furcation tube or at the entrance of the tube (e.g. due to a sharp bend or kink when inserting the fiber, which can happen if multiple fibers in the cable are twisted or tangled together and not carefully separated). Provided the fiber has been inserted far enough into the furcation tube, an installer can cut the tube prior to the break, insert the rest of the fiber, trim the excess bare fiber, and terminate the fiber, but this can make installing connectors or reaching different equipment ports difficult due to the remaining shortened length.

Multi-fiber optic cables described herein can include a plurality of individual optical fibers, each typically surrounded by a thin protective coating. Terminating these cables can involve, among other steps, extracting the fibers from a surrounding jacket or protective buffer tube and separating the fibers. To protect the individual fibers from mechanical stresses, dust, moisture, debris, or other environmental contaminants, as well as to provide a greater outside diameter for attachment of a connector, splice, or other termination, the fibers can be inserted into furcation assemblies. Furcation assemblies can include a rigid fan-out structure, sometimes referred to as a furcation body or a manifold, for maintaining a separation between and order of the individual fibers.

Figure 1:
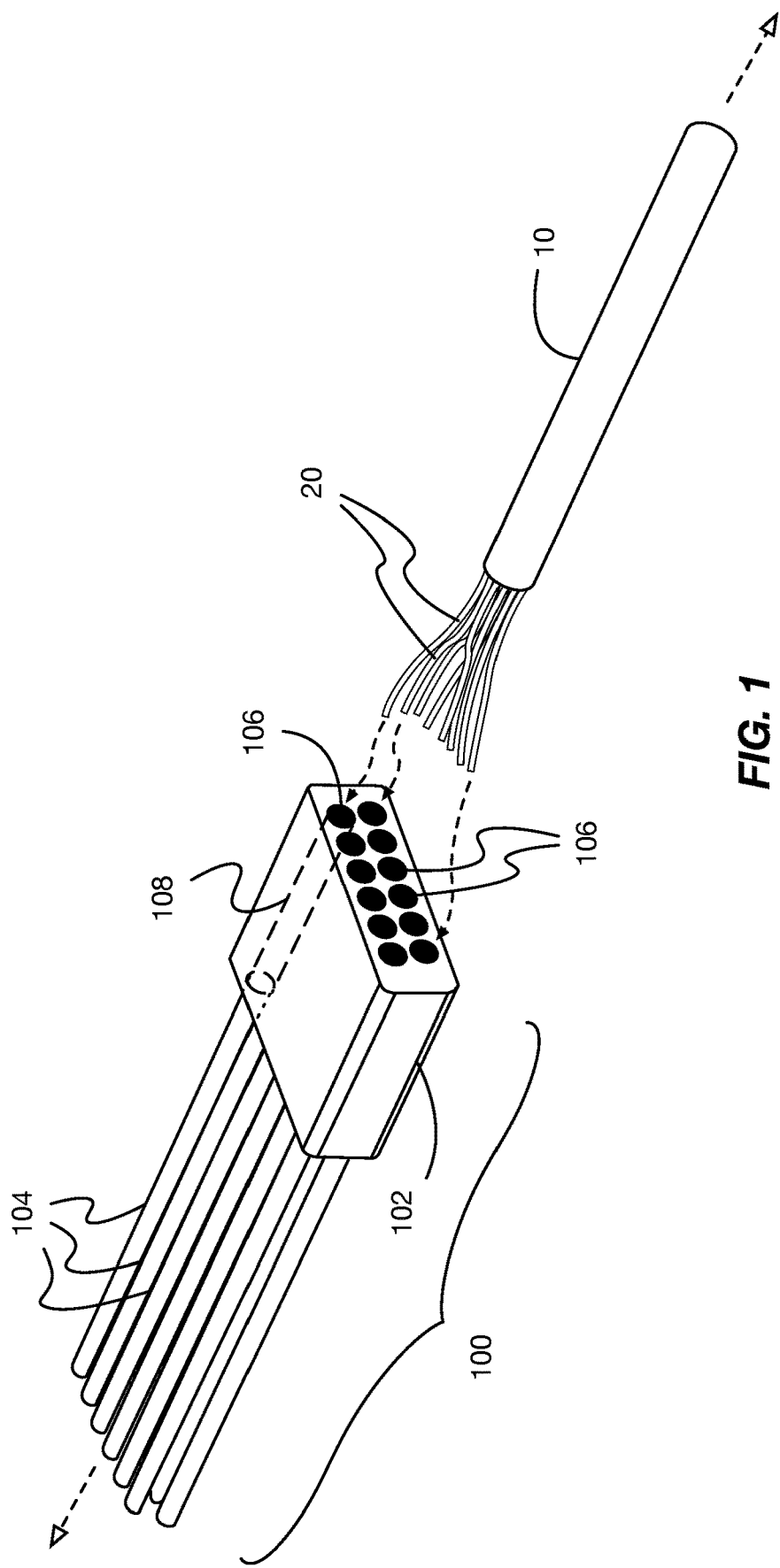
FIG. 1 is a perspective illustration of a portion of a furcation assembly.

FIG. 1 is a perspective illustration of a portion of a furcation assembly 100, comprising a furcation body or fan-out structure 102. The fan-out structure 102 can include at least one conduit 108. The conduits 108 can be disposed between a first face or surface (e.g., a front face) and a second opposing face or surface (e.g., a rear face) of the fan-out structure 102. The conduits 108 can include at least one opening 106. The conduits 108 can be parallel and sized to accommodate at least one fiber 20 of a multi-fiber cable 10. While FIG. 1 depicts the furcation assembly 100 including twelve conduits 108 with each conduit 108 including the opening 106, the furcation assembly 100 can be or include varying numbers and/or sizes of conduits 108. For example, the furcation assembly 100 can include a single conduit 108, and the conduit 108 can be sized to accommodate each fiber 20 of the multi-fiber cable 10, such that each fiber 20 of the multi-fiber cable 10 can be accommodated within the single conduit 108.

The furcation assembly 100 can also include at least one hollow buffer tube or furcation tube 104. The furcation tubes 104 can correspond to the conduits 108. Only a portion of the furcation tubes 104 are shown in the illustration of FIG. 1. The tubes can extend up to 1 meter or more in length. The furcation tubes 104 can be constructed of any suitable material, such as polyvinyl chloride (PVC), polytetrafluoroethylene (PTFE or Teflon), polyvinylidene fluoride (PVDF), polyproylene (PP), a thermoplastic polyester elastomer (TPE, such as Hytrel), or any other such material, and can be colored to distinguish individual fibers. Each furcation tube 104 can be fixed within a corresponding conduit 108 (e.g. passing through conduit 108 to a front face and bonded within the conduit 108 with a suitable adhesive or other bonding material). The furcation assembly 100 can also include additional structures or bodies not illustrated, such as a protective housing into which fan-out structure 102 is inserted after the fibers are installed through the furcation tubes 104. The protective housings can include attachments to a jacket or buffer of cable 10, water or dust-tight openings, etc.

To furcate the individual fibers, a surrounding jacket or buffer of a multi-fiber cable 10 can be removed or withdrawn to expose individual fibers 20. Only a portion of the individual fibers are shown for clarity; in practice, the jacket of the cable 10 can be removed to expose a greater length of the fibers, such as 0.5 meters, 1 meter, or any other such length. Accordingly, FIG. 1 should not be considered to be in scale. During installation, at least one fiber 20 can be cleaned, and carefully inserted into the opening 106 and the furcation tube 104 of the furcation assembly 100. While FIG. 1 depicts the furcation assembly 100 including twelve furcation tubes 104 with each furcation tube 104 fixed within a corresponding conduit 108, the furcation assembly 100 can include varying numbers and/or sizes of furcation tubes 104. For example, the furcation assembly 100 can include a single furcation tube 104 at least partially fixed within a corresponding conduit 108, and the furcation tube 104 can be sized to accommodate each fiber 20 of the multi-fiber cable 10, such that each fiber 20 of the multi-fiber cable 10 can be accommodated within the single furcation tube 104. The number of furcation tubes 104 and/or the size of the furcation tubes can correspond to at least one of a size of the conduits 108, a number of conduits 108, a size of a fiber 20, a number of fibers 20, a size of the cable 10 and/or a number of cables 10. For example, the modular furcation assembly 100 can include four conduits 108, and the number of furcation tubes 104 can be four with each furcation tube 104 at least partially fixed within a corresponding conduit 108.

As discussed above, furcation tubing is typically quite long, frequently around 0.5 meters, 1 meter, or more in length. Inserting a fiber into and through the full length of a furcation tube can be difficult and frustrating, as any snagging (which can be aggravated by dirt or debris encountered in typical installation environments) can result in the fiber breaking at some midpoint of the furcation tube. The fiber can break at the entrance to the furcation tube or furcation body, e.g. due to a tight bend or kink, such as when multiple fibers are tangled or intertwined within the buffer tube and cross over each other before entering the furcation tubes. Because multi-fiber cables can include large numbers of individual fibers (e.g. 6, 12, 18, 24, or any other number of fibers), the likelihood of breakage (and potentially having to cut back fibers and start again) is high. Provided the fiber has been inserted far enough into the furcation tube, an installer can cut the tube prior to the break and terminate the fiber (or cut the tube ahead of any blockage and push the fiber through the shortened tube), but this can make installing connectors or reaching different equipment ports difficult.

However, optical fibers are frequently stronger and less prone to kinking or breakage under tension than compression. Accordingly, by utilizing a pull wire attached to the fiber, the fiber can be pulled through the buffer tube with less chance of kinking or breakage, and resulting in significantly greater installation speed and success rates.

Figure 2A:
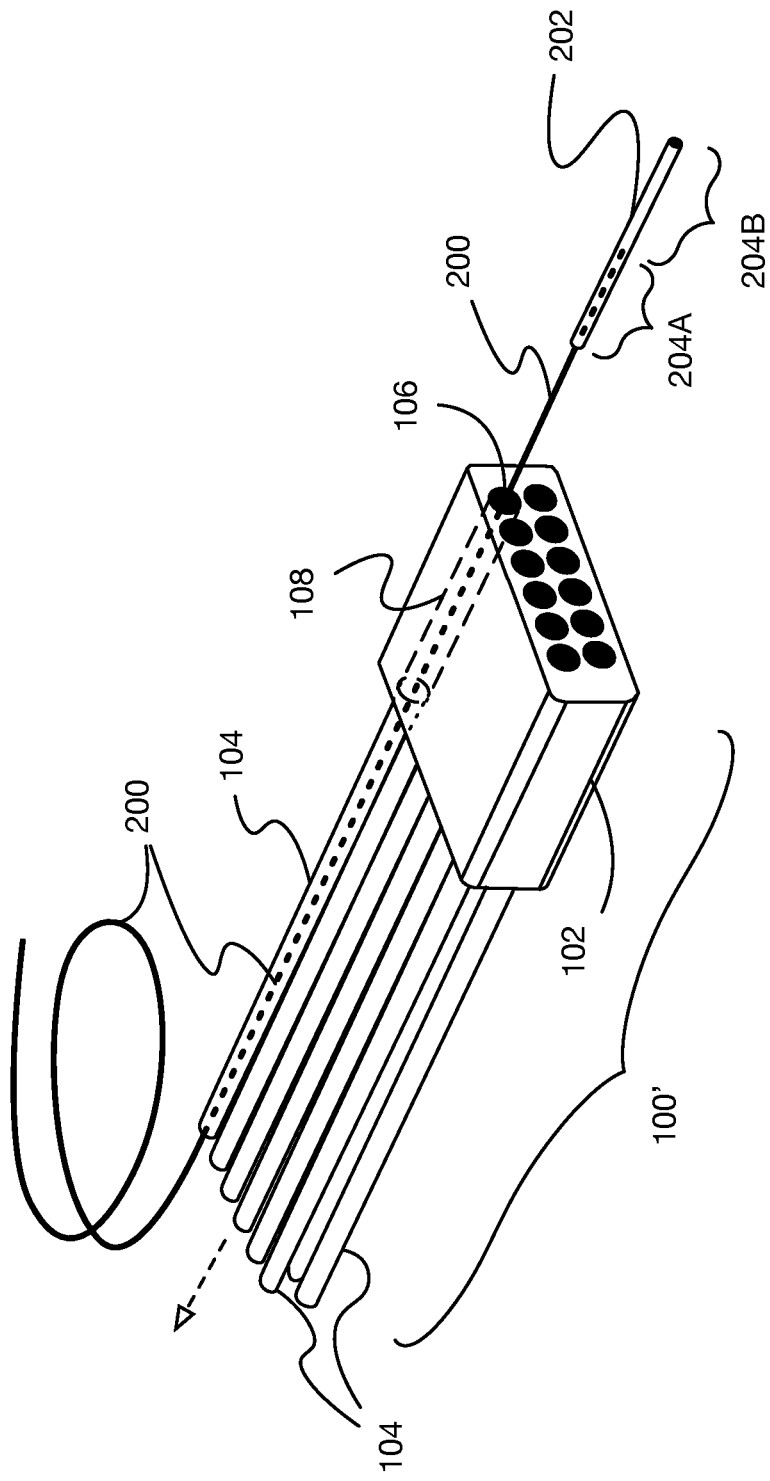
FIG. 2A is a perspective illustration of a furcation assembly utilizing a fiber pull and attachment structure.
Figure 2B:
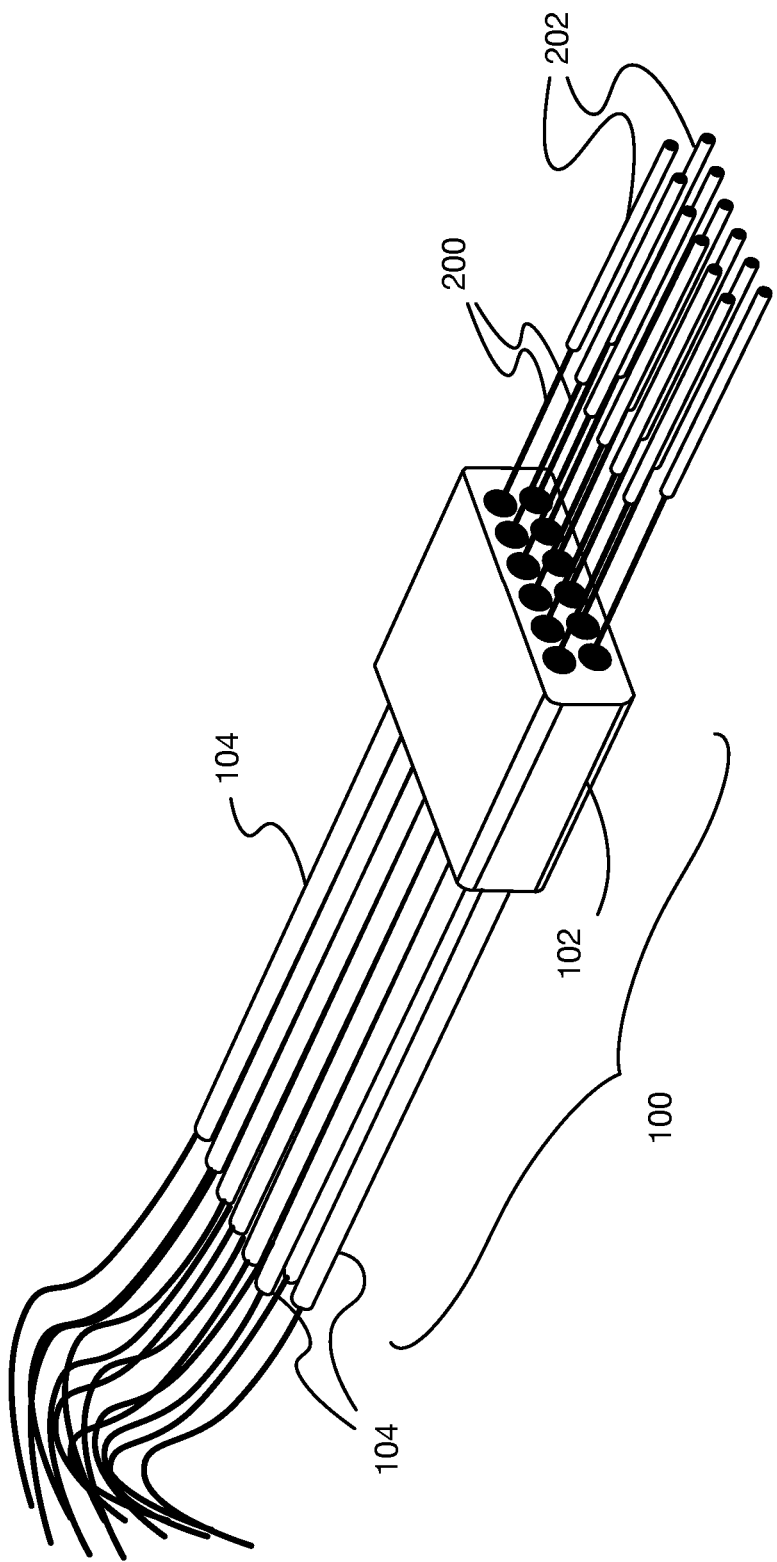
FIG. 2B is a perspective illustration of a portion of the furcation assembly of FIG. 2A.

FIG. 2A is a perspective illustration of a furcation assembly 100' utilizing a fiber pull 200 and attachment structure 202. A fiber pull 200, which can include at least one of a thread, glass fiber, monofilament thread or line, metal wire, or any other type and form of thread having an outer diameter less than an inner diameter of a furcation tube 104 can be threaded through (shown in dashed line) and extend beyond the furcation tube 104 and fan-out structure 102 (e.g. pre-threaded for pre-prepared furcation assemblies). An end of the fiber pull 200 extending through the fan-out structure 102 can be fixed within an attachment structure 202. The attachment structure 202 can include heat-shrink tubing (e.g. polyolefin, PVC, PTFE, or other such thermoplastic materials) with an outer diameter when shrunk that is smaller than an inner diameter of the furcation tube 104. The attachment structure 202 can include a UV-curable resin and UV light can be applied to fix the fiber in the structure. The attachment structure 202 can include an adhesive (e.g. a cyanoacrylate glue) and the fiber can be inserted into the adhesive (e.g. after being sprayed with an activator or accelerator such as acetone) to be fixed within attachment structure 202. These attachment methods can be combined (e.g., the attachment structure 202 can include an adhesive or heat-activated sealant within a heat-shrink tubing). As shown (in dashed line), the fiber pull 200 can extend into a first portion 204A of the attachment structure 202. The attachment structure 202 can be installed on the fiber pull 200 during installation. Although shown with only one fiber pull 200 the furcation assembly 100 can be provided with a plurality of fiber pulls 200 (and attachment structures 202) preinstalled (e.g. as a furcation kit).

Figure 2C:
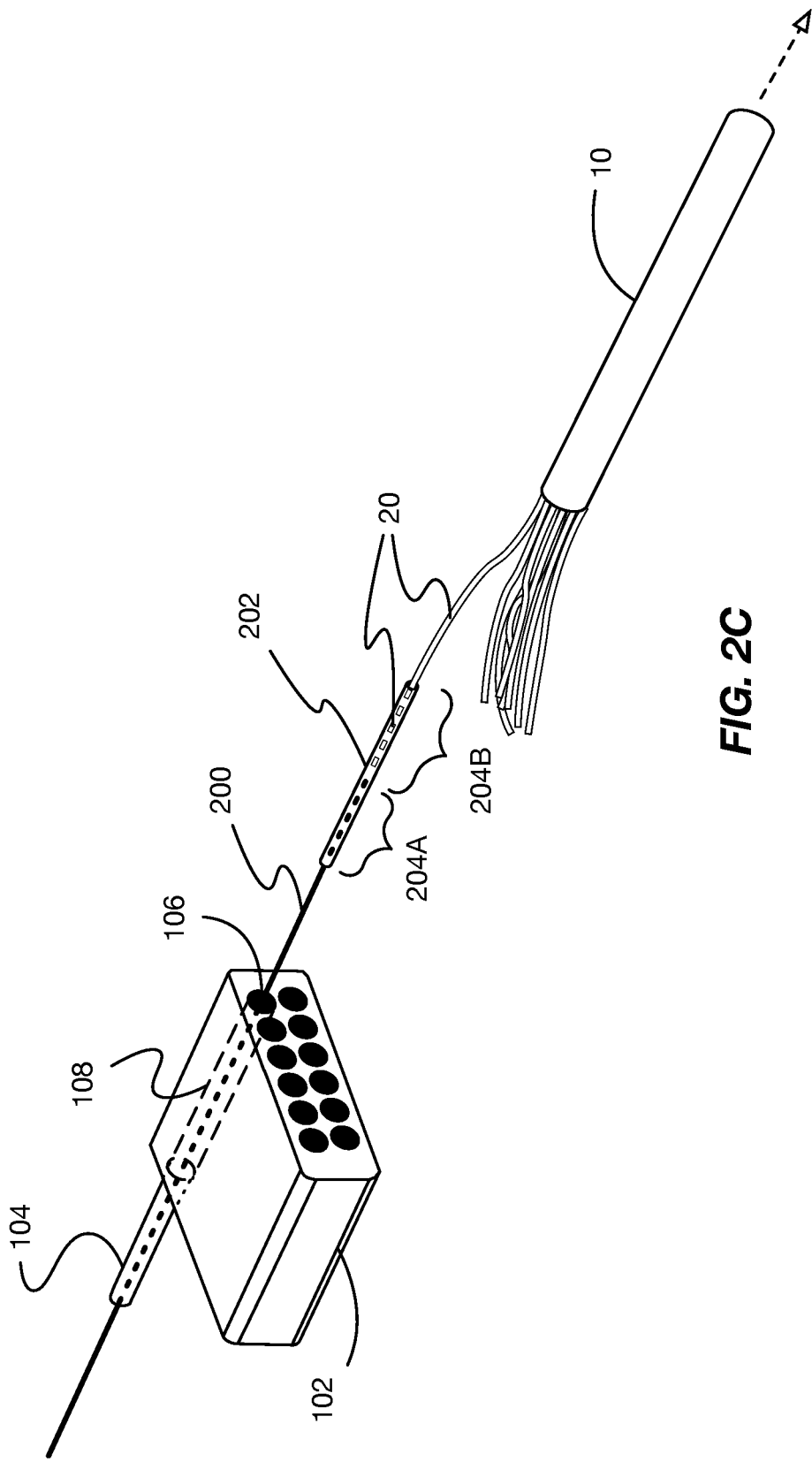
FIG. 2C is a perspective illustration of a portion of furcation assembly of FIG. 2A showing installation of an optical fiber into an attachment structure.

To furcate optical cables, as shown in the illustration of FIG. 2C, each fiber 20 can be removed from a surrounding buffer (or the buffer can be cut or removed), cleaned and inserted into a second portion 204B of the attachment structure 202. Heat or UV light or other curing energy can be applied to the attachment structure 202 to shrink the assembly and/or fix or cure any heat- or UV-activated adhesive, resin, or sealant to fix the fiber 20 within the second portion 204B of the assembly. An activator or catalyst can also be applied to the fiber prior to insertion into an adhesive or resin, such as an acetone activator.

Figure 2D:
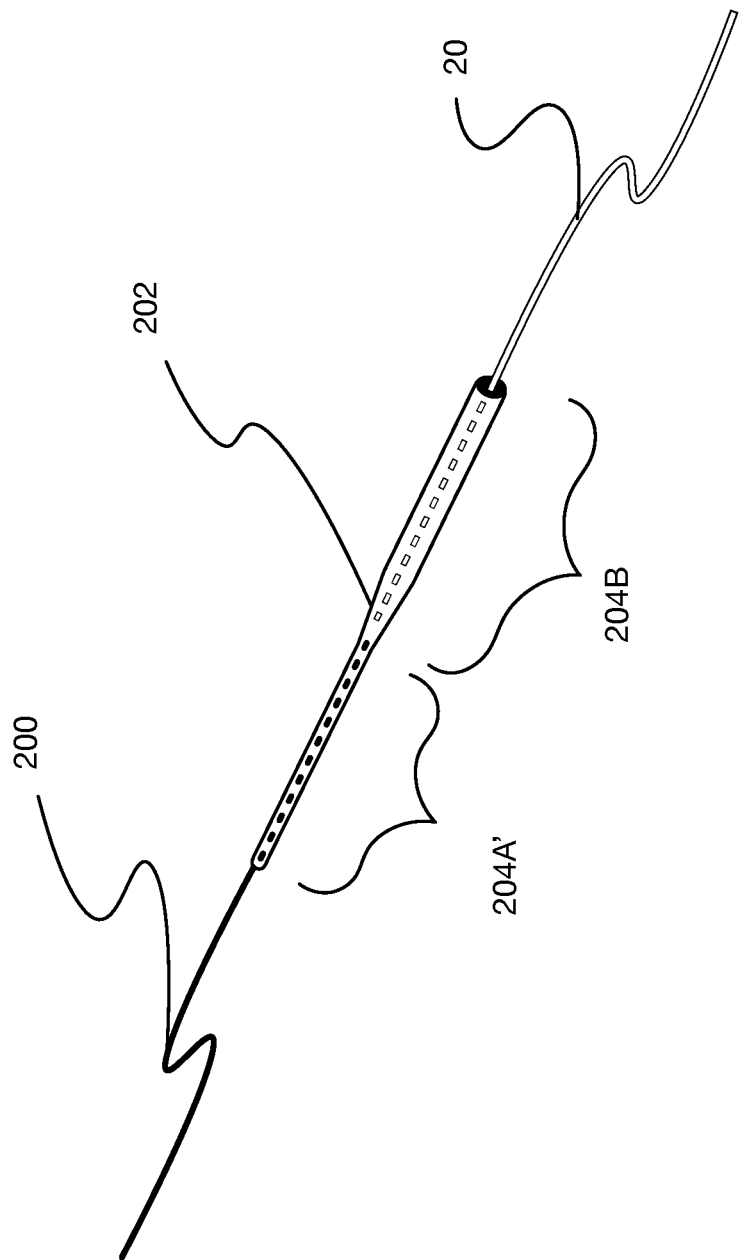
FIG. 2D is a perspective illustration of an attachment structure of a furcation assembly.

As shown in FIG. 2D, the first portion 204A of the attachment structure can be pre-shrunk or have an interior adhesive or sealant pre-heated or cured prior to installation of the fiber (e.g. to fix the fiber pull 200 within the attachment structure 202). Once the fiber 20 is fixed within the attachment structure 202, the fiber pull 200 can be withdrawn through the fan-out structure and furcation tube 104, pulling the fiber 20 through the furcation assembly 100. The multiple fibers 20 can be fixed within corresponding attachment structures 202 and the multiple corresponding fiber pulls 200 can be withdrawn simultaneously, greatly speeding up installation.

Although discussed above as a heat-shrink or similar thermoplastic attachment structure, mechanical attachment structures can be utilized, such as a woven mesh attachment (e.g. "finger trap") structure comprising a cylindrical, helically wound braid (sometimes referred to as a cable pull "sock", grip, or mesh). Pulling on the fiber pull can cause the braid to lengthen and narrow, tightening down and allowing pulling of the fiber pull and fiber. The mechanical attachment structures described herein can allow for reusable attachment structures. For example, a mesh attachment can be separate from the fiber pull wire or thread, and can be placed on both the pull wire and/or thread as well as the fiber to be pulled through the furcation tubing during installation. After pulling the fiber through the furcation tubing, the mesh attachment can be removed and reused for another fiber and thread. This can allow for more rugged attachment structures or structures with additional features that can be more expensive to manufacture (e.g. with additional friction elements on the internal surface of the mesh to aid grip such as micro hooks, ridges, or bumps, or other such features).

The attachment structure 202 and/or the fiber pull 200 can include a coating and/or be lubricated to allow for easier transition or sliding through the furcation tubing. For example, talc or similar lubricants can be utilized to reduce friction within the tubing for the fiber pull, attachment structure, and fiber.

Figure 3:
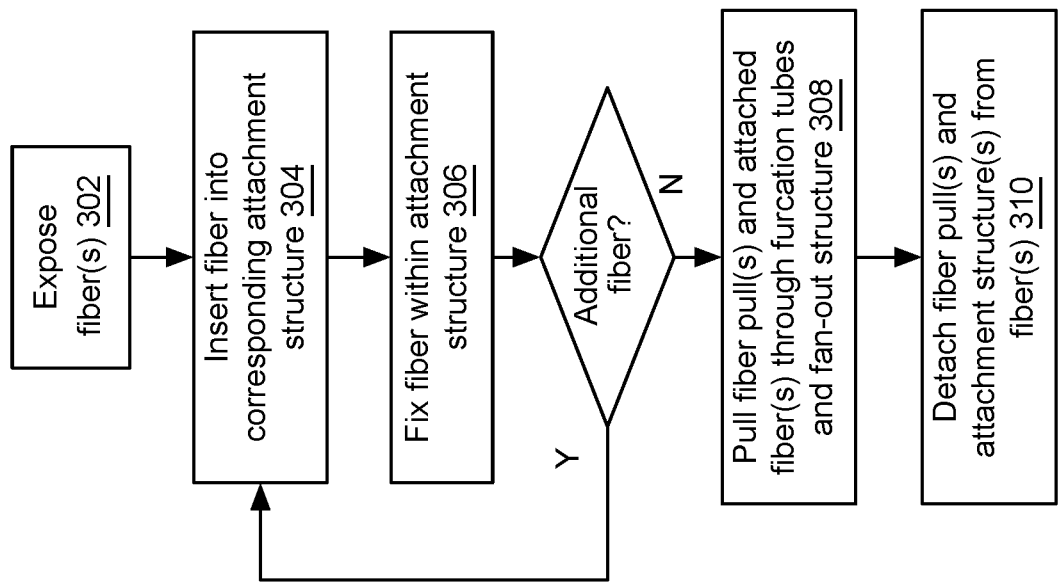
FIG. 3 is a flow chart of a method for optical fiber furcation.

FIG. 3 is a flow chart of a method for optical fiber furcation. At step 302, one or more fibers of a multi-fiber cable can be exposed. Exposing the fibers can comprise removing a jacket or buffer tube from the multi-fiber cable, and also can comprise stripping or cleaning a buffer or coating from each individual fiber. The fiber can be prepared to a predetermined length (e.g. 0.5 meters, 1 meter, 1.5 meters, or any other such length).

At step 304, the fiber can be inserted into a first portion of an attachment structure, with a fiber pull inserted through a corresponding buffer tube and conduit of a furcation assembly and inserted into a second portion of the attachment structure. At step 306, the fiber can be fixed within the attachment structure (e.g. by applying heat, ultraviolet light, or other energy to cause the attachment structure to shrink and/or cure an adhesive or sealant within the attachment structure). The fiber pull can be fixed within the attachment structure at the same time, or can be pre-fixed within the attachment structure (e.g. when provided as a pre-threaded furcation kit).

At step 308, the fiber pull or fiber pulls can be withdrawn or pulled through the furcation tubes and furcation body (either individually or simultaneously), pulling the corresponding fiber or fibers through the corresponding furcation tubes and conduits. At step 310, the attachment structure and fiber pull can be removed or detached (e.g. by cutting the fiber and/or furcation tube). The fiber and furcation tube can be then terminated normally (e.g. installed within a connector or splice or other housing). Steps 304-306 can be completed for one or more additional fibers prior to step 308 and steps 304-310 can be completed for each individual fiber in sequence.

Figure 4:
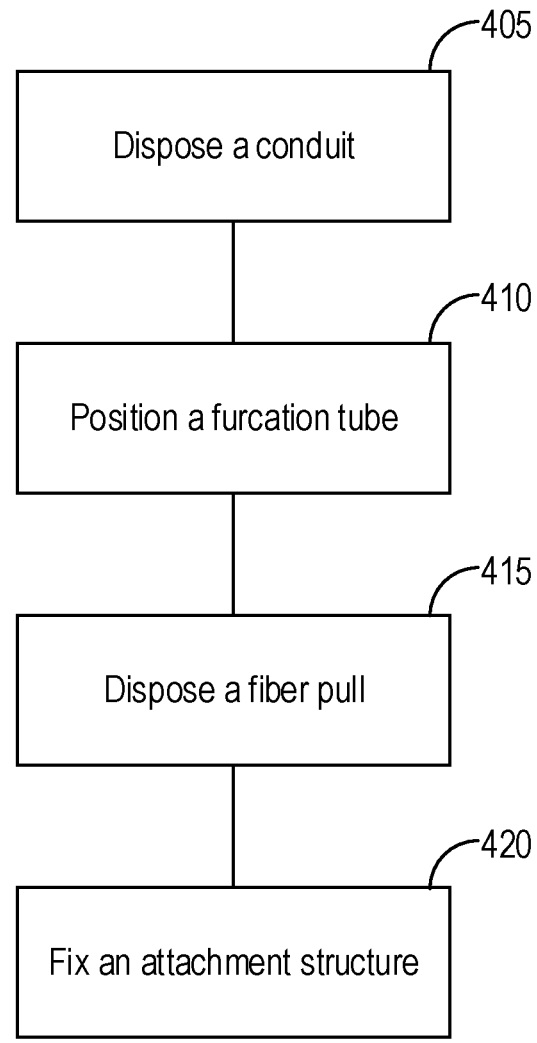
FIG. 4 is a diagram of a process of manufacturing a fiber optic furcation assembly.

FIG. 4 is a diagram of a process 400 of manufacturing a fiber optic furcation assembly. The fiber optic furcation assembly can be the furcation assembly 100. In ACT 405, a conduit can be disposed. The conduit can be the conduit 108. The conduit 108 can be disposed within the fan-out structure 102. The conduits 108 can be disposed within the fan-out structure 102 by placing, positioning, moving and/or locating the conduits 108 within the fan-out structure 102. The conduits 108 can extend from a first face of the fan-out structure 102 to an opposing second face of the fan-out structure. For example, the first face of the fan-out structure 102 can be or include the portion of the fan-out structure 102, as shown in FIG. 2A, that includes the opening 106 for the fiber pulls 200 to enter the conduits 108. Similarly, the second face of the fan-out structure can be or include the portion of the fan-out structure 102, as shown in FIG. 2A, that is opposite the portion that include the opening for the fiber pulls 200.

In ACT 410, a furcation tube can be positioned. The furcation tube can be the furcation tube 104. The furcation tubes 104 can be positioned within the conduits 108. The furcation tubes 104 can be positioned within the conduits 108 by locating, moving, placing and/or otherwise disposing the furcation tubes 104 within the conduits 108. The furcation tubes 104 can extend to a terminal end beyond the second face of the fan-out structure 102.

In ACT 415, a fiber pull can be disposed. The fiber pull can be the fiber pull 200. The fiber pull 200 can be disposed within the furcation tube 104. The fiber pull 200 can protrude in a first portion beyond the first face of the fan-out structure and the fiber pull 200 can protrude in a second portion beyond the terminal end of the furcation tube 104.

In ACT 420, an attachment structure can be fixed. The attachment structure can be the attachment structure 202. The attachment structure 202 can be fixed to the fiber pull 200. The attachment structure 202 can be fixed to the fiber pull 200 by mounting, placing, attaching, securing and/or otherwise coupling the attachment structure 202 with the fiber pull 200. The attachment structure 202 can receive and couple with an optical fiber. For example, the attachment structure 202 can receive and couple with the fiber 20.

Figure 5:
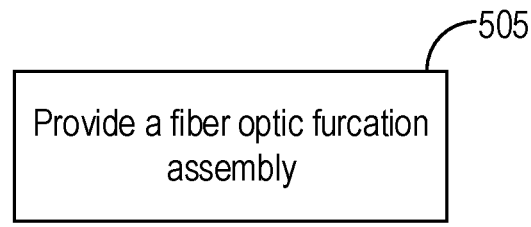
FIG. 5 is a diagram of a process of providing a fiber optic furcation assembly.

FIG. 5 is a diagram of a process 500 of providing a fiber optic furcation assembly. In ACT 505, a fiber optic furcation assembly can be provided. The fiber optic furcation assembly can be the furcation assembly 100. The furcation assembly 100 can be provided to a jobsite. For example, the furcation assembly can be placed, located, positioned, revealed or otherwise discovered at the jobsite. The furcation assembly 100 can provided upon the purchasing of the furcation assembly 100. The furcation assembly 100 can be provided with and/or as a furcation kit. The furcation assembly 100 can include a fan-out structure (e.g., the fan-out structure 102). The fan out structure can include a conduit (e.g., the conduit 108), and the conduit can extend from a first face of the fan-out structure to an opposing second face of the fan-out structure. The furcation assembly 100 can also include a furcation tube (e.g., the furcation tube 104). The furcation tube can be positioned within the conduit, and the furcation tube can extend to a terminal end beyond the second face of the fan-out structure. The furcation assembly 100 can also include a fiber pull (e.g., the fiber pull 200). The fiber pull can be positioned within the furcation tube, and the fiber pull can protrude in a first portion beyond the first face of the fan-out structure and the fiber pull can protrude in a second portion beyond the terminal end of the furcation tube, and the furcation assembly 100 can also include an attachment structure (e.g., the attachment structure 202). The attachment structure can be fixed to the first portion of the fiber pull, and the attachment structure can receive and couple with an optical fiber. The fiber pull can include a diameter and the attachment structure can include a diameter. The diameter of the fiber pull and the diameter of the attachment structure can be less than a diameter of the furcation tube.

Accordingly, implementations of the furcation assembly and methods discussed herein provide for faster and more efficient installation, with greater success rates and less chance of fiber breakage and loss.

The above description in conjunction with the above-reference drawings sets forth a variety of embodiments for exemplary purposes, which are in no way intended to limit the scope of the described methods or systems. Those having skill in the relevant art can modify the described methods and systems in various ways without departing from the broadest scope of the described methods and systems. Thus, the scope of the methods and systems described herein should not be limited by any of the exemplary embodiments and should be defined in accordance with the accompanying claims and their equivalents.

What is claimed is:

1. A fiber optic furcation assembly, comprising:
   a fan-out structure comprising a conduit extending from a first face of the fan-out structure to an opposing second face of the fan-out structure;
   a furcation tube positioned within the conduit, and the furcation tube extending to a terminal end beyond the second face of the fan-out structure;
   a fiber pull positioned within the furcation tube, and the fiber pull protruding in a first portion beyond the first face of the fan-out structure and protruding in a second portion beyond the terminal end of the furcation tube;
   an attachment structure fixed to the first portion of the fiber pull, and the attachment structure to receive and couple with an optical fiber;
   wherein a diameter of the fiber pull and a diameter of the attachment structure are less than a diameter of the furcation tube; and
   wherein the fiber pull includes a coating that is configured to surround a portion of an external surface of the fiber pull so as to adjust an amount of friction exerted by a portion of the furcation tube.

2. The fiber optic furcation assembly of claim 1, wherein the attachment structure includes a portion that is configured to adjust from a second diameter to the diameter of the attachment structure, the diameter of the attachment structure and the second diameter are different, and the attachment structure is configured to couple the optical fiber with the portion having the diameter of the attachment structure.

3. The fiber optic furcation assembly of claim 1, comprising:
   a second fiber pull configured to be positioned within a second furcation tube and protrude in the second portion beyond the terminal end of the furcation tube
   wherein the second furcation tube is configured to be positioned within a second conduit of the fan-out structure; and wherein the fiber pull is configured to couple with the second fiber pull at a location beyond the terminal end of the furcation tube.

4. The fiber optic furcation assembly of claim 1, wherein the fiber pull is configured to move the attachment structure from the first portion beyond the first face of the fan-out structure to the second portion beyond the terminal end of the furcation tube, and the attachment structure is configured to provide the optical fiber to the second portion beyond the terminal end of the furcation tube responsive to the fiber pull moving the attachment structure from the first portion beyond the first face of the fan-out structure to the second portion beyond the terminal end of the furcation tube.

5. The fiber optic furcation assembly of claim 1, wherein the attachment structure is configured to detach from the fiber pull, and the attachment structure is configured to reattach to the fiber pull.

6. The fiber optic furcation assembly of claim 1, comprising:
a second fiber pull positioned within a second furcation tube and the second fiber pull fixed to a second attachment structure; and
the attachment structure to provide the optical fiber and the second attachment structure to provide a second optical fiber, wherein the attachment structure and the second attachment structure provide the optical fiber and the second optical fiber together.

7. The fiber optic furcation assembly of claim 1, comprising:
the attachment structure to decouple from the optical fiber; and
the attachment structure to couple with a second optical fiber.

8. The fiber optic furcation assembly of claim 1, wherein the furcation tube includes an identifier that distinguishes the furcation tube from a second furcation tube positioned within a second conduit of the fan-out structure.

9. A fiber optic furcation assembly, comprising:
a furcation tube positioned within a fan-out structure, and the furcation tube extending to a terminal end beyond the fan-out structure;
a fiber pull positioned within the furcation tube, and the fiber pull protruding in a first portion beyond a face of the fan-out structure and protruding in a second portion beyond the terminal end of the furcation tube;
an attachment structure fixed to the first portion of the fiber pull;
wherein the attachment structure is configured to receive and couple with an optical fiber; and
wherein the fiber pull includes a coating that is configured to surround a portion of an external surface of the fiber pull so as to adjust an amount of friction exerted in a portion of the furcation tube.

10. The fiber optic furcation assembly of claim 9, comprising:
the furcation tube positioned within a conduit of the fan-out structure;
the conduit extending from the face of the fan-out structure to an opposing second face of the fan-out structure; and
the terminal end of the furcation tube extends beyond the second face of the fan-out structure.

11. The fiber optic furcation assembly of claim 9, wherein a diameter of the fiber pull and a diameter of the attachment structure are less than a diameter of the furcation tube, the attachment structure includes a portion that is configured to adjust from a second diameter to the diameter of the attachment structure the diameter of the attachment structure and the second diameter are different, and the attachment structure is configured to couple the optical fiber with the portion having the diameter of the attachment structure.

12. The fiber optic furcation assembly of claim 9, comprising:
a second fiber pull positioned within a second furcation tube and configured to protrude in the second portion beyond the terminal end of the furcation tube, and the second furcation tube positioned within the fan-out structure; and
wherein the fiber pull is configured to couple with the second fiber pull at a location beyond the terminal end of the furcation tube.

13. The fiber optic furcation assembly of claim 9, comprising:
the fiber pull to move the attachment structure from the first portion beyond the face of the fan-out structure to the second portion beyond the terminal end of the furcation tube; and
the attachment structure to provide the optical fiber to the second portion beyond the terminal end of the furcation tube responsive to the fiber pull moving the attachment structure from the first portion beyond the face of the fan-out structure to the second portion beyond the terminal end of the furcation tube.

14. The fiber optic furcation assembly of claim 9, comprising:
a second fiber pull positioned within a second furcation tube and the second fiber pull fixed to a second attachment structure; and
the attachment structure to provide the optical fiber and the second attachment structure to provide a second optical fiber, wherein the attachment structure and the second attachment structure provide the optical fiber and the second optical fiber together.

15. A method of manufacturing a fiber optic furcation assembly, comprising:
disposing a conduit within a fan-out structure, and extending the conduit from a first face of the fan-out structure to an opposing second face of the fan-out structure;
positioning a furcation tube within the conduit, and the furcation tube configured to extend to a terminal end beyond the second face of the fan-out structure;
disposing a fiber pull within the furcation tube, and protruding the fiber pull in a first portion beyond the first face of the fan-out structure and protruding the fiber pull in a second portion beyond the terminal end of the furcation tube;
disposing a coating on the fiber pull, wherein the coating is configured to surround at least a portion of an external surface of the fiber pull so as to adjust an amount of friction present within at least a portion of the furcation tube; and
fixing an attachment structure to the first portion of the fiber pull, and the attachment structure configured to receive and couple with an optical fiber.

16. The method of claim 15, comprising:
positioning a second fiber pull within a second furcation tube;
protruding the second fiber pull in the second portion beyond the terminal end of the furcation tube; and
positioning the second furcation tube within a second conduit of the fan-out structure, wherein the fiber pull is configured to couple with the second fiber pull at a location beyond the terminal end of the furcation tube.

17. The method of claim 15, comprising:
disposing a second fiber pull within a second furcation tube and the second fiber pull fixed to a second attachment structure; and
the attachment structure configured to provide the optical fiber and the second attachment structure configured to provide a second optical fiber;
wherein the attachment structure and the second attachment structure are configured to provide the optical fiber and the second optical fiber together.

18. A fiber optic furcation assembly, comprising:
a furcation tube configured to be positioned within a conduit, and the furcation tube configured to extend to a terminal end beyond a face of a fan-out structure;
a fiber pull configured to be positioned within the furcation tube, and the fiber pull configured to protrude in a first portion beyond a second face of the fan-out structure and configured to protrude in a second portion beyond the terminal end of the furcation tube;
an attachment structure configured to fix to the first portion of the fiber pull, and the attachment structure configured to receive and couple with an optical fiber; and
wherein the fiber pull includes a coating that is configured to surround a portion of an external surface of the fiber pull so as to adjust an amount of friction exerted by a portion of the furcation tube.

* * * * *